(12) United States Patent
Ferrara et al.

(10) Patent No.: US 7,778,937 B2
(45) Date of Patent: Aug. 17, 2010

(54) SYSTEMS AND METHODS FOR PREDICTING WAIT TIME FOR SERVICE TRANSACTIONS

(75) Inventors: Filomena Ferrara, Marino (IT); Luca Landi, Marino (IT)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 12/116,584

(22) Filed: May 7, 2008

(65) Prior Publication Data

US 2009/0281817 A1 Nov. 12, 2009

(51) Int. Cl.
*G06Q 10/00* (2006.01)
(52) U.S. Cl. .................................. 705/304; 707/102
(58) Field of Classification Search ................ None
See application file for complete search history.

(56) References Cited

U.S. PATENT DOCUMENTS

| | | | |
|---|---|---|---|
| 4,838,384 A | 6/1989 | Thangavelu | |
| 5,006,983 A | 4/1991 | Wayne et al. | |
| 5,506,898 A * | 4/1996 | Costantini et al. | 379/266.06 |
| 5,978,770 A | 11/1999 | Waytena et al. | |
| 6,023,681 A | 2/2000 | Whitt | |
| 6,707,905 B2 * | 3/2004 | Lenard | 379/266.01 |
| 6,829,583 B1 * | 12/2004 | Knapp et al. | 705/5 |
| 6,876,993 B2 * | 4/2005 | LaButte et al. | 706/47 |
| 2002/0114442 A1 * | 8/2002 | Lieberman et al. | 379/266.06 |
| 2006/0277550 A1 * | 12/2006 | Williams et al. | 718/107 |
| 2007/0136118 A1 | 6/2007 | Gerlach et al. | |
| 2007/0250355 A1 | 10/2007 | Leet et al. | |

FOREIGN PATENT DOCUMENTS

WO WO03/062101 7/2003

* cited by examiner

*Primary Examiner*—John G Weiss
*Assistant Examiner*—Sangeeta Bahl
(74) *Attorney, Agent, or Firm*—Tutunjian & Bitetto, P.C.; Jill A. Poimboeuf

(57) ABSTRACT

Systems and methods are provided to automatically predict wait times for customers to obtain service transactions at a service establishment, wherein wait times are estimated based on a combination of wait time values determined from current and historical service information that is collected, stored and processed over time.

1 Claim, 2 Drawing Sheets

SYSTEMS AND METHODS FOR PREDICTING WAIT TIME FOR SERVICE TRANSACTIONS

TECHNICAL FIELD

Embodiments of the invention relate to systems and methods for automated prediction of wait time for service transactions and in particular, systems and methods for collecting and managing current and historical service information that is used for determining estimated wait times for individuals seeking services at an establishment.

BACKGROUND

Customers that patronize certain establishments, such as post offices, banks, restaurants, etc., are frequently required to wait in line before obtaining services. While customers typically expect some delay in obtaining a desired service at a given establishment, customers will not know how long they will have to wait to obtain the service until they actually arrive at the establishment. Certain establishments such as postal offices or banks attempt to manage customer service using some form of central management system for queuing and scheduling waiting lists wherein, for example, a customer is required to obtain a reservation number before gaining access to the particular service.

By way of specific example, some establishments employ a ticketing device that provides customers with numbered tickets to provide an ordered "waiting list" that is managed as a single queue (typically displayed on a monitor), wherein customer service agents/personnel will sequentially serve each person in order in the queue After a customer has obtained a service, the office personal will update the "waiting list" (e.g., by pressing a control button) so that the next customer in queue can gain access to the service.

Although the conventional service management systems which maintain a running "waiting list" may be sufficient for managing a service from the perspective of the establishment providing such service, such conventional service systems are not desirable from the perspective of the customers seeking certain services. For example, conventional systems typically do not provide the customer an estimate, or at least an accurate estimate, of the expected wait time for the next available point in the current waiting list. Moreover, even when a customer is added to the waiting list and provided some form of estimated wait time, the customer cannot leave the establishment without risking the chance of losing acquired position in the waiting list if the customer is not available at the time when the customer's spot in the waiting list queue is reached.

SUMMARY OF THE INVENTION

Exemplary embodiments of the invention generally include systems and methods for automatically predicting wait times for service transactions. More specifically, exemplary embodiment of the invention include systems and methods for collecting and managing current and historical service information and using the service information for determining estimated wait times for customers seeking services at an establishment.

In one exemplary embodiment, an automated method for managing personal service transactions includes continuously collecting and storing current service information in real-time with regard to service transactions provided to customers at a service establishment, processing the current service information to determine a current service throughput data for each unit time period in a given day and storing current service throughput data, processing the stored current service throughput data collected over a period of days, months and years to determine historical service throughput data. In response to a customer request to obtain a service, the method further includes providing the customer with an estimate of a waiting time for obtaining access to the service based on the customer's position in a waiting list queue. In one exemplary embodiment, providing an estimate of the waiting time includes estimating a first waiting time using the stored current service throughput data for a previous unit time period, estimating a second waiting time based on the stored historical service throughput data and estimating the waiting time based on a weighted percentage of the first and second estimated waiting time values.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
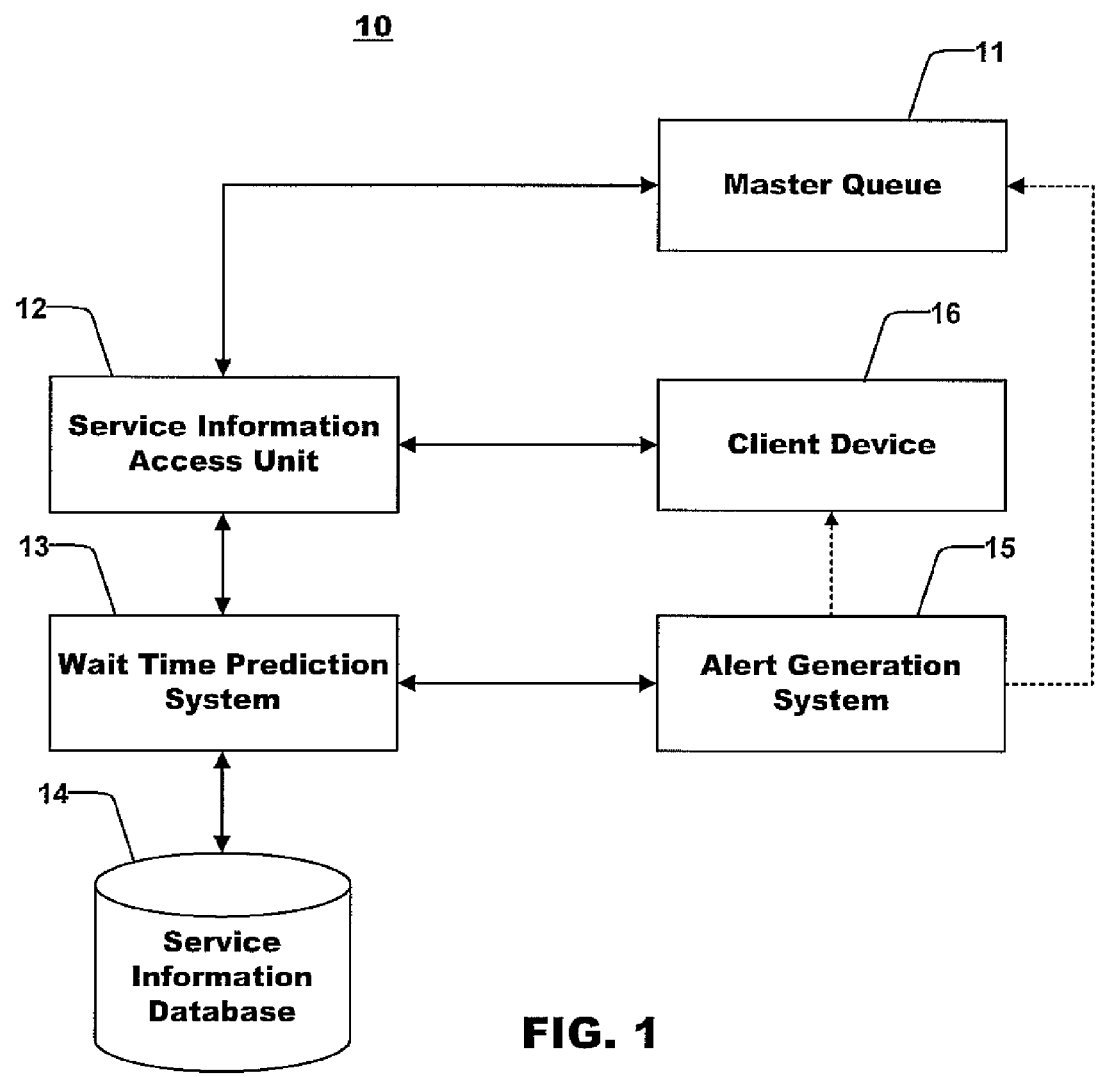
FIG. 1 depicts a system for managing customer waiting lists and providing estimated wait times for customer service, according to an exemplary embodiment of the invention.

Exemplary embodiments of systems and methods for managing the queuing customers for access to services will now be discussed in further detail with reference to FIGS. 1 and 2. It is to be understood that the systems and methods described herein in accordance with the present invention may be implemented in various forms of hardware, software, firmware, special purpose processors, or a combination thereof. In particular, exemplary systems and methods described herein may be implemented in software comprising program instructions that are tangibly embodied on one or more program storage devices (e.g., hard disk, magnetic floppy disk, RAM, CD ROM, DVD, ROM and flash memory), and executable by any computing device or machine comprising suitable architecture. It is to be further understood that because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention FIG. 1 depicts a system (10) for managing customer waiting lists and providing estimated wait times for customer service, according to an exemplary embodiment of the invention. The system (10) generally comprises a master queue module (11), a service information access unit (12), a wait time prediction system (13), a service information database (14, an alert generation system (15), and client access device (16). In general, the system (10) can be implemented by various types of service providing establishments (banks, postal office, restaurant, etc.) to allow customers to obtain service information, reserve a position in a waiting list for receiving a desired service, receive an estimate of a "wait time" to gain access to a service, and receive alerts/notifications.

The master queue (11) is a computing system that maintains information describing the current state and reservation status for obtaining a given service at the establishment. For example, the master queue (11) is associated with a waiting list monitor that monitors the current state of the waiting list for the service and keeps track of how customers are in queue for the service. The master queue system (11) may include a display system that displays the current waiting list and other information to customers.

The service information access unit (12) allows a customer to obtain relevant information regarding service availability, making reservation in the waiting list (reserve a position), obtaining wait time information for accessing a service, etc. The service information access unit (12) may be a server (or may be connected to a server) that resides on a centralized computer system of the service establishment. A customer can interact with the service information access unit (12) via any suitable user interface such as, e.g., an access terminal unit that is disposed at an establishment (e.g., at the entrance to the building), which may be a monitor that displays a graphical user interface with I/O via a keyboard, buttons or touch screen technology, for example.

A customer may communicate with the service information access unit (12) via a client device (16). The client device (16) may be a computing device that executes a browser application that enables access to the service access information unit (12) over a communications network such as the Internet. The client device (16) may be a portable computing device such as a mobile telephone, or a handheld wireless PDA device capable of communicating with the service information access unit (12) to obtain service information or reserve a turn in the waiting list.

The wait time prediction system (13) implements methods according to exemplary embodiments of the invention for estimating a wait time for a given service. Estimate waiting time is calculated on an estimate of the "waiting time" snapshot of a recent history of an average time for performing a service for a unit time (e.g., per hour) and a monthly/yearly stored value that is determined statistically based on historical data maintained in the database (14) for service time averages per unit time over previous weeks/years. The wait time prediction system (13) will provide an estimated wait time and provide the estimated value to the service information access unit (12) to display (or otherwise present) to a customer.

The service information database (14) stores various types of service information including previous statistic information, customer information, historical service data, and other information which is used for computing wait times, support alert notifications, and support other service management functions.

The alert generation system (15) operates in conjunction with the wait time prediction system (13) to determine times at which service alerts/notifications are to be provided to customers to provide advance warning that their position in the waiting list queue is approaching. The alert generation system (15) can send alert notifications directly to the client device (16) of the customer or to a display monitor of the master queue system (11) to provide notice on a screen, etc. The alert notification can be established through a reservation process in which a customer performs via the service information access unit (12). When making a reservation in the waiting list, if the predicted waiting time is long and the customer does not want to wait at the establishment for his/her turn in the queue, the customer could request that an alert notification be sent to the customer at some advance time (e.g., 5-10 minutes) before the predicted wait time elapses. For example, the customer could input a telephone number of mobile phone or pager along with other relevant reservation information (via the service access information unit (12), which is stored in the service information database (14). The information stored in the database (14) can then be used by the wait time prediction system (13) to determine appropriate time to send alerts to customers, as discussed below.

An exemplary process for predicting estimate waiting times according to an exemplary embodiment of the invention will now be discussed in detail. As mentioned above, an exemplary method for estimating the wait time for individuals seeking services at an establishment is based on a combination of (i) an estimate of waiting time as determined from recently collected service information (e.g., within last hour) and (ii) an estimate of waiting time as determined from statistical analysis of historical service information collected over a previous month or year, for example. In the following discussion, the term $TA_h$ denotes an "estimated waiting time" that is computed based on a recent history of service throughput per unit time for a most recent period of time e.g., last hour. The estimated waiting time $TA_h$ can be determined as follows.

First, the term Ts denotes a time period for a performing a single transaction, which may be computed as:

$$Ts = (\text{transaction end time} - \text{transaction start time}).$$

In other words, Ts denotes a period of time for a performing a given transaction which is determined in real-time from service information collected while services are being provided to customers at the establishment. The value of Ts may be computed as the difference between the time when a customer gains access to the service and the time when the service is completed. The transaction start time may be automatically determined as the time when the reservation number for a customer in the queue is first selected for and the "transaction end time" is the time that a next successive reservation number in the waiting list queue is selected. By tracking the time period Ts for performing each of a plurality of service transactions over a unit period of time (e.g., 1 hour), an average service time MTs can be computed as follows:

$$MT_S = \frac{T_{S1} + T_{S2} + \ldots T_{Sn}}{n}$$

where n is the number of transactions processed by office personnel in the current unit period (e.g., last 1 hour). Then, the estimated waiting time for the previous unit of time is computed as:

$$TA_h = \frac{(MT_n * C * K)}{N}$$

where C is a current number of customers in queue in the waiting list, where N denotes a number of operators/agents that are on staff to perform the services, and K is a correction factor that estimates the number of people that are not present when called and lost their position. For example, K may be computed as:

$$K = \frac{P - NP}{P},$$

where P denotes the number of customer actually processed, and NP denotes the number of customers that when called, where not available for processing and lost their position in queue.

The system software will continuously collect and process the information that is used for computing $TA_h$ for each unit period of time (e.g., hourly), and store all values of TAh computed in a given week for a given year in the database (14) and processed for statistical analysis to determine statistical trends that enable the system to determines a statistical estimated wait time TAs a well defined day of the week and normalizing it against the historical data.

Using the current and statistical estimated wait times, the system will determine the actual wait time TA to be presented to a user as follows:

TA=(TAh*K1)+(TAs*K2), wherein K1=0.25 and K2=0.75, for example, where K1+K2=1.0. In this manner, the actual estimated wait time TA is based on percentage of an historical value TAs computed by statistical analysis of TAh data over time, and a percentage of a current value TAh as determined under current operating conditions.

Figure 2:
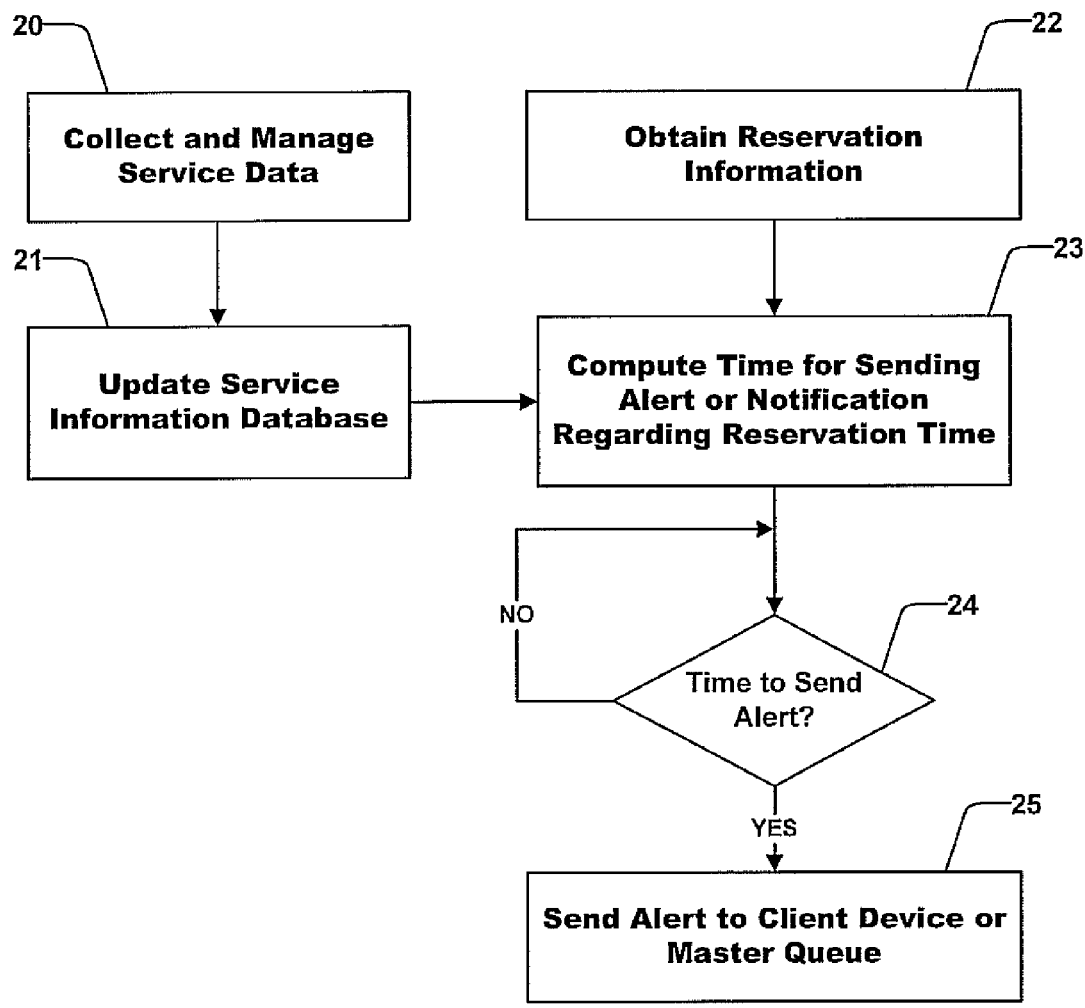
FIG. 2 is a flow diagram of a method for managing customer waiting lists and providing estimated wait times for customer service, according to an exemplary embodiment of the invention.

FIG. 2 is a flow diagram of a method for managing customer waiting lists and providing estimated wait times for customer service, according to an exemplary embodiment of the invention. FIG. 2 illustrates an exemplary mode of operation of the system (10) of FIG. 1 for processing a reservation request from a customer, wherein the process steps are executed by various components of system (10). As noted above, the system software will continuously collect and process service data (step 20) and store the information in the service information database (14)(step 21) over time. For example, the system continually collects in that is used for computing $TA_h$ for each unit period of time (e.g., hourly), and store all values of TAh computed in a given week for a given year in the database (14) and then statistically analyzes the stored data to determine statistical trends over time that enables to determine statistical estimated wait time TAs for different days of the week, different weeks of the month, and/or different months of the year, which is normalized against the historical collected data.

A customer seeking to make a reservation in a wait list for a given service will interact with the service information access unit (12) to obtain reservation information (step 22). The customer may enter a command to obtain information regarding the current status and availability for obtaining a given service, wherein the system will estimate a wait time and present the estimated wait time to the user. The user can reserve his/her turn in the waiting list and proceed, if desired, with a reservation process where the customer could request that an alert notification be sent to the customer at some advance time (e.g., 5-10 minutes) before the predicted wait time elapses. As noted above, for example, the customer could input a telephone number of mobile phone or pager along with other relevant reservation information (via the service access information unit (12), which is stored in the service information database (14).

The system will compute a time for sending an alert or notification to the customer based on the customer's position in the waiting list queue (step 23). In particular, by way of example, the time for sending an alert can be determined by first predicting an estimated wait time using current and historical service information such as described above, and then scheduling an alert notification time at some requested time in advance of the estimated wait time. If the estimated wait time is relatively long, the system may recompute the estimated wait time for a give customer at some periodic interval of time to take into account real-time servicing conditions (e.g., service throughput, current position of customer in waiting list queue, etc.) and update the alert notification time.

Once it is determined that it is time to send an alert (step 24), the system will send an alert to the customer via the client device telephone of the customer and or on the queue system monitor on the premises of the service establishment (step 25). In particular, when the reservation time of the service is approaching, the alert notification system can send a signal to the customer in the form of an audible message, beeping sound, a visual indication, or vibration, or other tactile stimuli, depending on the client device used. The customer will then proceed to the service establishment and timely obtain the desired service.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An automated method for managing personal service transactions, comprising:

continuously collecting and storing current service information in real-time with regard to service transactions provided to customers at a service establishment, processing the current service information to determine a current service throughput data for each unit time period in a given day and storing current service throughput data;

processing the stored current service throughput data collected over a period of days, months and years to determine historical service throughput data; and in response to a customer request to obtain a service, providing the customer with an estimate of a waiting time for obtaining access to the service based on the customer's position in a waiting list queue, wherein providing an estimate of the waiting time comprises estimating a first waiting time using the stored current service throughput data for a previous unit time period, estimating a second waiting time based on the stored historical service throughput data and estimating the waiting time based on a weighted percentage of the first and second estimated waiting time values, wherein the estimated first waiting time is computed by employing the relation $TA_h=(MT_s*C*K)/N$ where $TA_h$ is the estimated first waiting time, $MT_s$ is the average time in which a service transaction is completed during the previous unit time period, C is a current number of customers in the waiting list queue, K estimates a number of customers that fail to respond to a call to engage in a corresponding service transaction, and N is a total number of agents available to perform service transactions, and wherein said automated method is implemented in and executed by a computing device employing at least one storage device.

* * * * *